United States Patent [19]

Pappas

[11] Patent Number: 5,023,303

[45] Date of Patent: Jun. 11, 1991

[54] ALPHA, BETA-DIACID/N,N-SUBSTITUTED DIAMINE ADDUCT CATALYST FOR EPOXY RESIN AND ACID POLYESTER

[76] Inventor: S. Peter Pappas, 2417 E. Country Club Dr., Fargo, N. Dak. 58103

[21] Appl. No.: 150,167

[22] Filed: Jan. 29, 1988

[51] Int. Cl.$^5$ ............... C08L 63/02; C08L 63/06; C08L 67/02
[52] U.S. Cl. .................... 525/438; 525/934
[58] Field of Search ......................... 525/438

[56] References Cited

U.S. PATENT DOCUMENTS

| 4,119,679 | 10/1978 | Nishizawa et al. | 525/438 |
| 4,216,238 | 8/1980 | Baker et al. | 560/37 |
| 4,847,348 | 7/1989 | Fischer et al. | 525/438 |

FOREIGN PATENT DOCUMENTS

| 55-80430 | 6/1980 | Japan | 525/438 |
| 0735531 | 8/1955 | United Kingdom | 525/438 |

OTHER PUBLICATIONS

68 *J. Am. Chem. Soc.* 1657 (1946).
75 *J. Am. Chem. Soc.* 4911 (1953).
27 *J. Org. Chem.* 2677 (1962).
Heft 7, 798.
*J. Chem. Soc.* 3305 (1957).

*Primary Examiner*—John C. Bleutge
*Assistant Examiner*—Robert E. Lee Sellers, II
*Attorney, Agent, or Firm*—Vidas & Arrett

[57] ABSTRACT

The invention relates to a latent catalyst for epoxy resin containing compounds according to formula 1

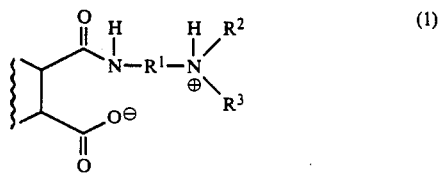

in which
$R^1 = C_1-C_{10}$ alkyl or aryl
$R^2$ and $R^3$ are the same or different $C_1-C_6$ alkyl, $C_6-C_8$ aryl or $R^2$ and $R^3$ form together a 4–8 membered ring in which $R^1$, $R^2$ and/or $R^3$ can contain an ether-oxygen or sulphur atom, in which the amide and acid groups are in an a-b position bound to an aliphatic or aromatic group.

11 Claims, No Drawings

ALPHA, BETA-DIACID/N,N-SUBSTITUTED DIAMINE ADDUCT CATALYST FOR EPOXY RESIN AND ACID POLYESTER

The invention regards temperature latent catalysts for e.g. epoxy-carboxylic acid reactions.

Epoxy-acid reactions are well known in the art (see e.g. U.S. Pat. No. 4,147,737). An important use of epoxy-acid reactions is in the field of epoxy-polyester powder-coatings. Those powders are applied at—for instance—steel plate at room temperature and cured at high temperature (140°–220° C.). In order to get a smooth continuous coating it is prerequisite that the powder particles show a good keeping stability and that after application, they melt and flow, before the curing reaction proceeds too far. On the other hand the curing reaction has to be as fast as possible in order to shorten the production process. Hence, there exist a need for latent catalyst systems, that do not show activity up to 100°–120° C. and are very active above 120° C.

A new class of compounds has now been discovered, that, mixed with epoxy and polyesters resins shows only above a certain temperature, a good catalytic activity. The latent catalysts according to the invention can be described by formula 1

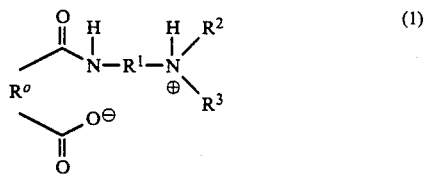

where the structure

represents the residue of an α,β-aliphatic, cycloaliphatic or aromatic dicarboxylic acid and $R^0$ is an aliphatic, or cycloaliphatic aromatic group; $R^1$ is a $C_1$–$C_{10}$ alkylene or arylene group which may be interrupted by an ether oxygen atom or a sulfur atom; and $R^2$ and $R^3$ are the same or different $C_1$–$C_6$ alkyl or $C_6$–$C_8$ aryl groups or, $R^2$ and $R^3$ together with the nitrogen atom to which they are attached form a 4–8 member ring. The $R^2$ and $R^3$ groups may also optionally be interrupted by an ether oxygen atom or a sulfur atom.

In between 100° and 120° C. the amide will form with the carboxyl group an imide group releasing a water molecule. During this reaction the proton on the quaternary nitrogen is liberated and the tertiary amine can perform its catalytic activity.

So the invention is also embodied in a catalyst with formula

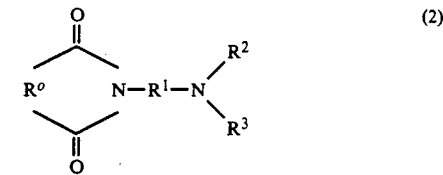

in which $R^0$, $R^1$, $R^2$ and $R^3$ are as previously described.

Preferably $R^1$ is $C_2$–$C_4$ alkylene or phenylene.

$R^2$ and $R^3$ are preferably $C_1$–$C_4$ alkyl or together with the nitrogen atom to which they are attached form a 5 or 6 membered ring.

$R^0$ contains preferably 2 to 12 carbon atoms, more in particular 6–10 carbon atoms. The group is preferably cyclic in nature, either aliphatic, ethylenically unsaturated, or aromatic.

The latent catalyst can be prepared by reacting a compound containing a alpha,beta-diacid group preferably an anhydride group with an N,N-substituted-diamine.

The diacid can be e.g. phthalic acid anhydride, tetrahydrophthalic acid anhydride, tetracarboxylic benzene di-anhydride, maleic acid anhydride, trimellitic-acid anhydride, cyclohexane-dicarboxylic-acid anhydride, or tetracarboxylic naphthalene-dianhydride.

As $R^1$ e.g. ethylene, propylene, 1,4-phenylene, butylene, cyclohexylene or cyclopentylene can be chosen.

As $R^2$ and $R^3$ e.g. methyl, ethyl, propyl, iso-propyl, butyl, isobutyl, t-butyl, benzyl or phenyl can be chosen, or they can form, together with the nitrogen atom to which they are attached, a ring structure like e.g. morpholinyl.

The latent catalyst can be mixed with resins like bisphenol-A based epoxy resin, triglycidyl isocyanurate and other epoxy resins, together with acid group containing oligomers or polyesters. The polyester resins are preferably based on aromatic carboxylic acids like iso- and terephthalic acids and aliphatic glycols like neopentylglycol, propylene glycol, butanediol and the like. Preferably the polyester has an acid number between 10–100 mg KOH/100 g polyester. Some trifunctional monomers can be used in a limited amount, e.g. trimethylolpropane, trimelitic acid anhydride and the like.

The resins, catalyst and additives are generally melt-mixed in an extruder, cooled and ground to a fine powder, that can be applied as powder coating.

As additives especially colourants, UV-stabilizers, flow additives and anti-foaming agents can be mentioned.

The powder has good curing characteristics and a long shelf-live, even if high amounts of latent catalysts are used.

The invention will be further elucidated by the examples, without being limited thereto.

EXAMPLES

Latent Catalysts Synthesis (1) Dimethylaminopropylamine-phthalic acid anhydride adduct.

Dimethylaminopropylamine (DMP) (0.44 ml) (0.005 mol plus 4% excess, 0.02 ml) in 5 ml acetonitrile was added dropwise, at room temperature under a nitrogen purge, to a stirred solution of phthalic anhydride (PA) (0.442 gr) (0.005 mol) in 25 ml acetonitrile. A fine white precipitate formed immediately. It was stirred at room temperature for one hour and then placed in the refrigerator overnight. The product was filtered, washed with cold acetonitrile and dried under vacuum for two days to yield 0.785 gr. The product became shiny and shrank at 114° C. with bubbles forming at 118° C. At 146° C. the product began to melt with a clear melt obtained by 154° C.

(2) Dimethylaminoethylamine-phthalic acid anhydride adduct.

The synthesis was carried out as described in 1 with phthalic anhydride and dimethylaminoethylamine (DME) (1:1 plus 4% mol ratio). A precipitate formed ten minutes after all the amine was added. The product shrank at 132° C., at 133°-134° C. small bubbles formed and a clear melt was obtained.

(3) Diethylaminoethylamine-phthalic acid anhydride adduct.

The synthesis was carried out as in 1 using phthalic anhydride and diethylaminoethylamine (DEE) (1:1 plus 4% excess mol ratio) in both 1,2-dichloroethane and acetonitrile. In both cases an oil was produced and after two months in a refrigerator crystals are starting to form.

(4) Diethylaminopropylamine-phthalic acid anhydride adduct.

The synthesis was carried out as in 1 using phthalic anhydride and diethylaminopropylamine (DEP) (1:1 plus 4% excess mol ratio) in 1,2-dichloroethane.. A white precipitate formed after the solution was allowed to sit overnight in a refrigerator and the flask scratched. At 146° C. bubbles form in the product and a clear melt occured at 149° C. No observable shrinkage occured prior to melting.

(5) Aminopropylmorpholine-phthalic acid anhydride adduct.

The synthesis was carried out as in 1 using phthalic anhydride and 4(3-aminopropyl)morpholine (DMorph) (1:1 plus 4% excess mol ratio) in 1,2-dichloroethane. A fine white precipitate formed ten minutes after all of the amine was added. The product shrank slightly at 140° C. and turned pink at 142° C. as the temperature was raised, the color became redder. At 146° C. shrinking increased and a red clear melt with bubble formation occured at 147° C.

(6) Dimethylphenylenediamine-phthalic acid anydride adduct.

The synthesis was carried out as in 1 using phthalic anhydride and N,N-dimethylphenylene diamine (DMPhen) (1:1 plus 4% excess mol ratio) in chloroform. A fine precipitate formed after half of the amine was added. The solution was stirred for one hour at room temperature and filtered immediately to give a green solid. This was recrystalized in ethanol and treated with decolorizing charcoal to yield pale yellow crystals. The product began to shrink at 153° C. and turned bright yellow from 157°-163° C. Shrinking continued as the temperature increased until a clear orange melt occured at 258° C.

(7) Dimethylaminopropylamine-cylcohexane dicarboxylic acid anhydride adduct.

The synthesis was carried out as in 1 using cis-1,2-cyclohexanedicarboxylic anhydride (CHA) and dimethylaminopropylamine (1:1 plus 4% excess mol ratio) in acetonitrile. A precipitate formed after the solution wsa left overnight in the refrigerator and the flask scratched. The product became shiny and shrank at 117° C. and a clear melt occured from 124°-128° C.

(8) Dimethylaminopropylamine-phthalic anhydride adduct.

The synthesis was carried out as in 1 using phthalic anhydride and dimethylaminopropylamine (1:2 plus 4% excess mol ratio). A precipitate did not form and could not be obtained by chilling, scratching the flask, or seeding with product.

Powder Coatings

Four powder coatings were prepared using a commercial available type of carboxyl terminated polyester resin (Uralac P 3500-DSM Resins) with an acid value of 33 and a glas transition temperature of 58° C., epoxy resin as a crosslinker (Araldit GT 7004—Ciba-Geigy) with an epoxy equivalent weight of 725 and titanium dioxide as a pigment (Kronos RN 59—Kronos Titan GmbH). The coatings were catalysed with amic acids based on phthalic acid anhydride and N,N-dimethyl-1-diaminopropane (DMAP), N,N-diethyl-1,3-diaminopropane (DEAP), one with imidazol, a catalyst commonly used in practice and one without a catalyst as a reference. Their composition are given in the following table in parts by weight.

TABLE 1

| | POWDER COATING | | | |
|---|---|---|---|---|
| | I | II | A | B |
| Uralac P 3500 | 700 | 700 | 700 | 700 |
| Araldit GT 7004 | 300 | 300 | 300 | 300 |
| Kronos RN 59 | 500 | 500 | 500 | 500 |
| DMAP | 10 | — | — | — |
| DEAP | — | 10 | — | — |
| imidazol | — | — | 10 | — |

The preparation of the powder coatings was done by extrusion at 110° C., using a lab extruder Buss-Ko-Kneader PR 46 followed by milling and sieving operation in order to exclude powder particles bigger than 50 microns. The coatings where applied by an electrostatic spray method using a GEMA manual spray gun type HP720 on 0.9 mm steel panels protected with zinc phosphate (Bonder 130) in a thickness of approximately 50 microns. The stoving was done at 200° C. for 10 minutes in an air-circulated oven. In order to compare the catalytic activity of the different catalysts the curing of the coating was followed by differential scanning calorimetry using DSC-30 Metler apparatus with a heating rate of 20° C./minute. The temperature of onset cure ($T_o$), the peak temperature ($T_p$) and the temperature of the end of the curing process ($T_e$) are given in table 2 together with the properties of the cured films.

It is quite obvious that both of the amic acid catalysts show latency in comparison with the imidazol and to the non catalyst system which has no good mechanical properties due to the very slow and incomplete curing. Also it was very difficult to determine, $T_o$, $T_p$ and $T_e$ in the non catalysed system.

TABLE 2

| | POWDER COATING | | | |
|---|---|---|---|---|
| | I | II | A | B |
| Pensil hardness | F | F | F | F |
| Reverse Impact (inch/pound) (Gardner ⅝ inch ball) | 160 | 160 | 160 | None |
| Slow penetration (Ericsen) (in mm) | 8 | 8 | 8 | 1 |
| $T_{onset}$ | 142 | 154 | 110 | difficult to be noticed |
| $T_{peak}$ | 182 | 196 | 150 | no clear |

| | POWDER COATING | | | |
|---|---|---|---|---|
| | I | II | A | B |
| $T_{end}$ | 218 | 233 | 200 | peak difficult to be noticed |
| Film appearance | smooth surface | smooth surface | emphasized orange peel effect | smooth surface |

Due to the latent behavior of the amic acid catalyst and the postponed $T_{onset}$ cure there is longer time available for flow at the coating after melting in comparison with the imidazol catalysed system. The result is a coating surface with smooth glossy appearance in contrast to the emphasized orange peel effect in the case of imidazol catalysed system.

The other latent catalysts showed similar behaviour as DMAP and DEAP.

I claim:

1. A thermally curable epoxy composition comprising:
   an epoxy resin;
   an acid group containing polyester; and
   a cure catalyzingly effective amount of a compound having the formula:

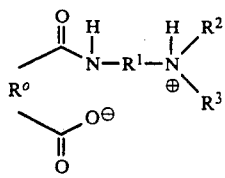 (1)

or the formula:

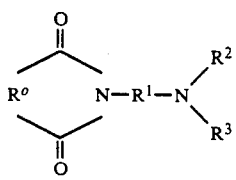 (2)

where the structure

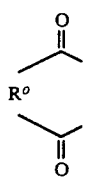 (1a)

represents the residue of an α,β-aliphatic, cycloaliphatic or aromatic dicarboxylic acid and $R^0$ is an aliphatic, cycloaliphatic or aromatic group; $R^1$ is a $C_1$-$C_{10}$ alkylene group, an arylene groups or a $C_1$-$C_{10}$ alkylene group interrupted by an ether oxygen atom or a sulfur atom; and $R^2$ and $R^3$ are the same or different $C_1$-$C_6$ alkyl group, a $C_1$-$C_6$ alkyl group interrupted by an ether oxygen atom or a sulfur atom, a phenyl group, a benzyl group, or $R^2$ and $R^3$ are the same or different $C_1$-$C_6$ alkyl groups or $C_1$-$C_6$ alkyl groups interrupted by an ether oxygen atom or a sulfur atom which together with the nitrogen atom to which they are attached form a 4-8 member ring.

2. A composition as in claim 1 wherein the cure catalyzing compound is a compound of formula (1).

3. A composition as in claim 1 wherein the cure catalyzing compound is a compound of formula (2).

4. A composition as in claim 1 wherein $R^1$ is ethylene, propylene, 1,4-phenylene, butylene, cyclohexylene or cyclopentylene and $R^2$ and $R^3$ are independently methyl, ethyl, propyl, iso-propyl, butyl, isobutyl, t-butyl, benzyl or phenyl or $R^2$ and $R^3$ together with the nitrogen atom to which they are attached form a morpholinyl group.

5. A composition as in claim 1 wherein the group

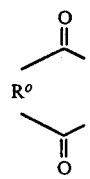 (1a)

is the residue of an acid selected from the group consisting of phthalic acid, tetrahydrophthalic acid, benzenetetracarboxylic acid, maleic acid, trimellitic acid, cyclohexanedicarboxylic acid and napthalenetetracarboxylic acid.

6. A composition as in claim 5 wherein said acid is cyclohexanedicarboxylic acid, phthalic acid or benzenetetracarboxylic acid, $R^1$ is ethylene, propylene, or phenylene and $R^2$ and $R^3$ are independently methyl or ethyl groups or $R^2$ and $R^3$ together with the nitrogen atom to which they are attached form a morpholinyl group.

7. A composition as in claim 6 in the form of a powder coating.

8. Powder coating according to claim 7, wherein the polyester has an acid number between 10-100.

9. Powder coating according to claim 8, wherein the epoxy resin is a bisphenol-A based epoxy resin, diglycidylterephtalate or triglycidylisocyanurate.

10. A composition as in claim 7 further comprising a colorant.

11. A process for thermally curing a composition of an epoxy resin and an acid group containing polyester comprising
   adding to the composition an catalyzingly effective amount of a compound of the formula:

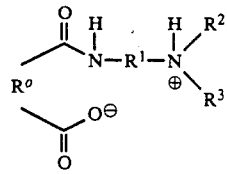 (1)

where the structure

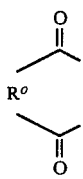 (1a)

represents the residue of an α,β-aliphatic, cycloaliphatic or aromatic dicarboxylic acid and $R^0$ is an aliphatic, cycloaliphatic or aromatic group; $R^1$ is a $C_1-C_{10}$ alkylene group, an arylene groups or a $C_1-C_{10}$ alkylene group interrupted by an ether oxygen atom or a sulfur atom; and $R^2$ and $R^3$ are the same or different $C_1-C_6$ alkyl group, a $C_1-C_6$ alkyl group interrupted by an ether oxygen atom or a sulfur atom, a phenyl group, a benzyl group, or $R^2$ and $R^3$ are $C_1-C_6$ alkyl groups or $C_1-C_6$ alkyl groups interrupted by an ether oxygen atom or a sulfur atom which together with the nitrogen atom to which they are attached form a 4–8 member ring heating the composition to a temperature above 120° C.

* * * * *